June 8, 1971   R. O. DE LA HUNT   3,582,997
DEVICE FOR CONTROLLING FLUID FLOW
Filed Feb. 24, 1969   3 Sheets-Sheet 1

RAMES O. DE LA HUNT
INVENTOR.

BY

Tom Sherrard, atty.

RAMES O. DE LA HUNT
INVENTOR.

BY

Tom Sherrard, atty.

RAMES O. DE LA HUNT
INVENTOR.

BY

Tom Sherrard, atty.

United States Patent Office 3,582,997
Patented June 8, 1971

3,582,997
DEVICE FOR CONTROLLING FLUID FLOW
Rames O. De La Hunt, 13032 Julian Ave.,
Lakeside, Calif. 92040
Continuation-in-part of application Ser. No. 769,846,
Oct. 23, 1968. This application Feb. 24, 1969, Ser.
No. 814,224
Int. Cl. E03d 1/12
U.S. Cl. 4—43                               7 Claims

ABSTRACT OF THE DISCLOSURE

This invention comprises a non-valve means for controlled release of fluid from a container. It is a structure to utilize the inverted siphon principle. A designated quantity of liquid in the device may be expelled therefrom simply by an operator starting the siphoning action.

This is a continuation-in-part to the abandoned application bearing Ser. No. 769,846, filed Oct. 23, 1968, now abandoned.

BACKGROUND OF THE INVENTION

The conventional method of causing a fluid, such as water, to be exhausted from a container or reservoir is by the use of valves. Valves don't always seat properly, especially after long periods of wear. Other shortcomings associated with moving parts are not uncommon. These include high cost of manufacture of some valves, and the gradual deterioration of some valve materials under certain conditions.

It is now common practice to use a floating valve in the reservoir of the usual water closet. Such arrangements often waste water by faulty seating of the valve; they are noisy and wear out.

My improved system permits the use of less water in the flushing process; it eliminates most of the usual noise associated therewith. It is fool-proof, very durable, economical and practically maintenance free.

The inverted siphon is not new. Briefly described, it involves the separation of two quantities of the same liquid by a compressed gas (usually air). Both quantities may be at rest until some of the captured air between them is removed, or the liquids are otherwise forced together. When the two quantities thusly unite, a continuous flow results in response to gravity and surface pressure.

SUMMARY

My improved device provides a novel means for controlling the time of starting the inverted siphon whereby a reservoir may be emptied of a specified quantity of liquid at anytime, simply by a slight manipulation by an operator.

BRIEF DESCRIPTION OF THE DRAWINGS

In the drawings showing preferred embodiments of my invention.

DESCRIPTION OF PREFERRED EMBODIMENTS

Figure 2:
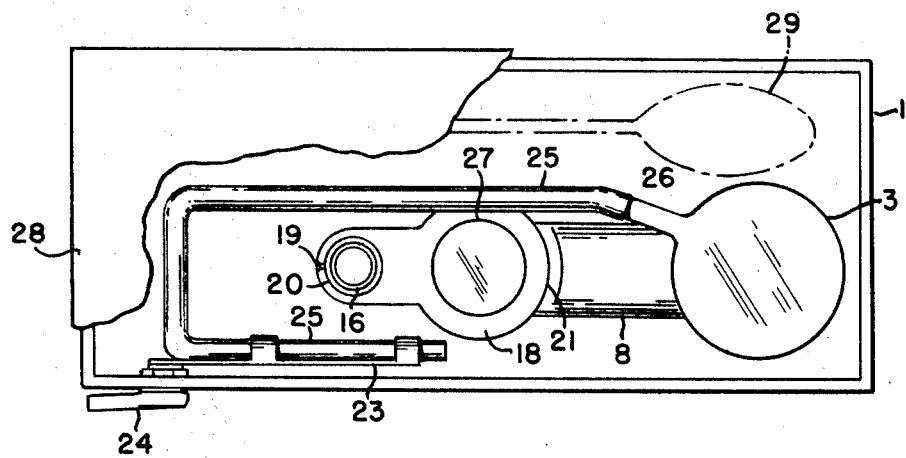
FIG. 2 is a top plan view thereof.

Referring to the drawings forming a part hereof wherein like numerals represent like parts throughout, the numeral 1 designates an outer fluid container. When my invention is used as part of an ordinary toilet, item 1 will be the usual reservoir with lids 28. Associated therewith is the well known water inlet 17. As is customary, the inlet flow is cut off by floating bulb 29 of FIG. 2, which operates the cut-off valve (not illustrated). Other conventional parts, used without change, are overflow pipe 16, collar 20 with set screw 19 thereon and retainer 18 bearing on the surface of a later described member at point 21.

Figure 7:
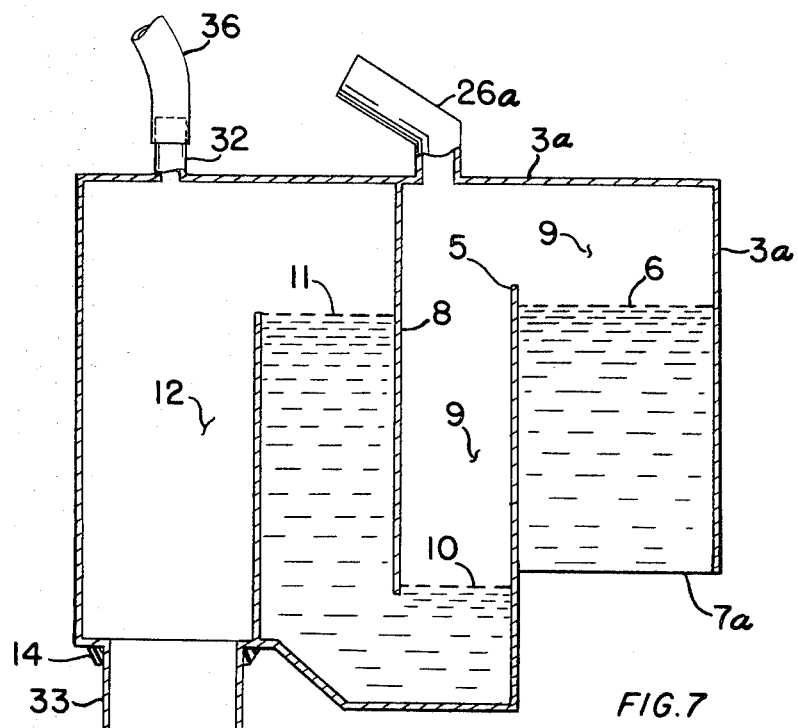
FIG. 7 is a front elevation of a reservoir containing my device representing a modification of that shown in FIG. 1.
Figure 8:
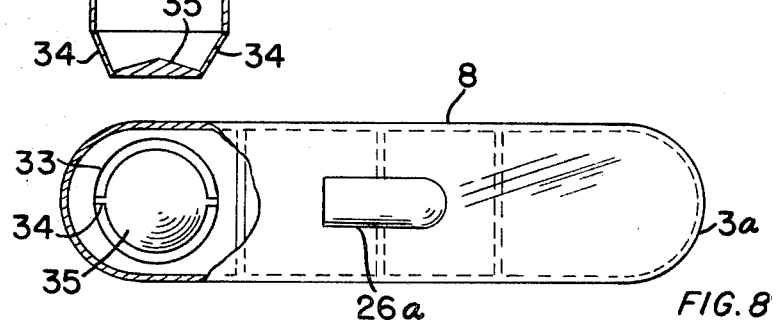
FIG. 8 is a top plan view of such modification.

An important novel member of my invention is conduit 8. Although an N-shaped configuration is illustrated, other shapes will work equally as well provided there is a portion to trap water. The structure shown in FIG. 7 is a suitable arrangement of portions. The well known U-shaped trap section may be used.

As can be seen, conduit 8 is constructed of a pipe of about the same diameter as the usual outlet section 31 which leads the conventional bowl. The downwardly directed portion of conduit 8 snugly fits into sealing elements comprising rubber gasket 14 between rings 13 and 15. Its end is open at the base for uninterrupted flow of liquid into outlet 31.

A section closed by cover 27 may extend upwardly therefrom to smooth the flow of water by the cushioning action of air in upper space 12. This air cushioning section may be in various shapes. Also it may be made of an elastic material. A parallel section of conduit 8 has its opening oppositely directed to that of the first mentioned portion. Between these two vertical sections a section is connected as illustrated. It forms an elbow at the base of the container with the upward extending section of 8 and it forms another elbow above the base with the downward section structured as a continuous passageway.

Figures 3, 4:
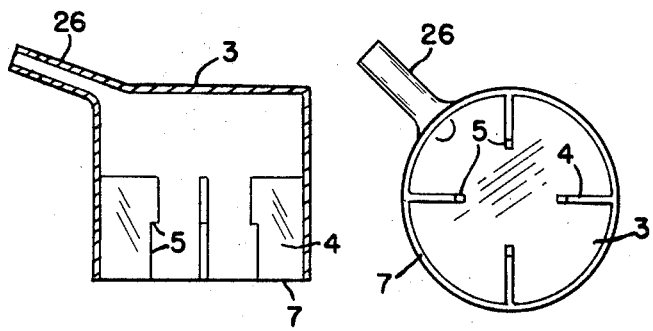
FIG. 3 is a side elevation detail of an inverted cup wherein the compressed air-water exchange begins.
FIG. 4 is a top plan view of the detail.

A bell-shaped cap or inverted cup 3 is suspended over the upper end of conduit 8, aligned so their walls are parallel and the center of their cross sections are concentric. The space 7 between their overlapping walls is sufficient to form a passageway for the fluid. A plurality of supports 4 each with stop 5 abutting the upper rim of the conduit opening holds the cap in position. See FIGS. 3 and 4.

An air escape means is essential to the preferred form of my invention. Such means is preferably an air passageway 25 formed as a flexible tube, one end 22 of which is open and the other end of which leads into the space at the bottom of the inverted cup 3. An appropriate stem 26 may complete the linkage.

For simple control, arm 23 retains that portion of tube 25 near its open end 22. The arm is affixed to conventional handle 24 on the outside of the tank.

Figure 1:
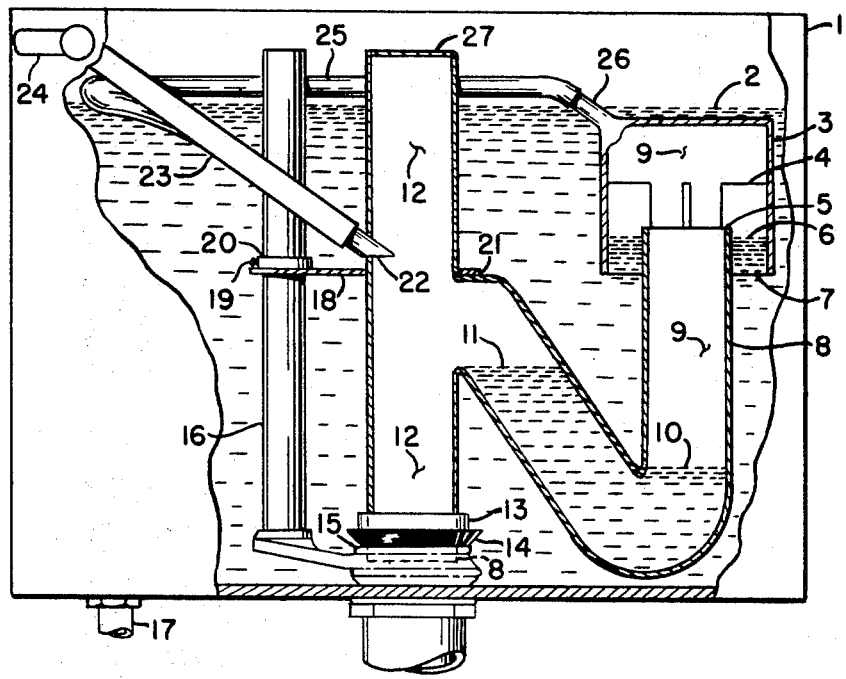
FIG. 1 is a front elevation of a reservoir containing my device with a portion of the front wall removed showing the system ready for the flushing operation.
Figure 5:
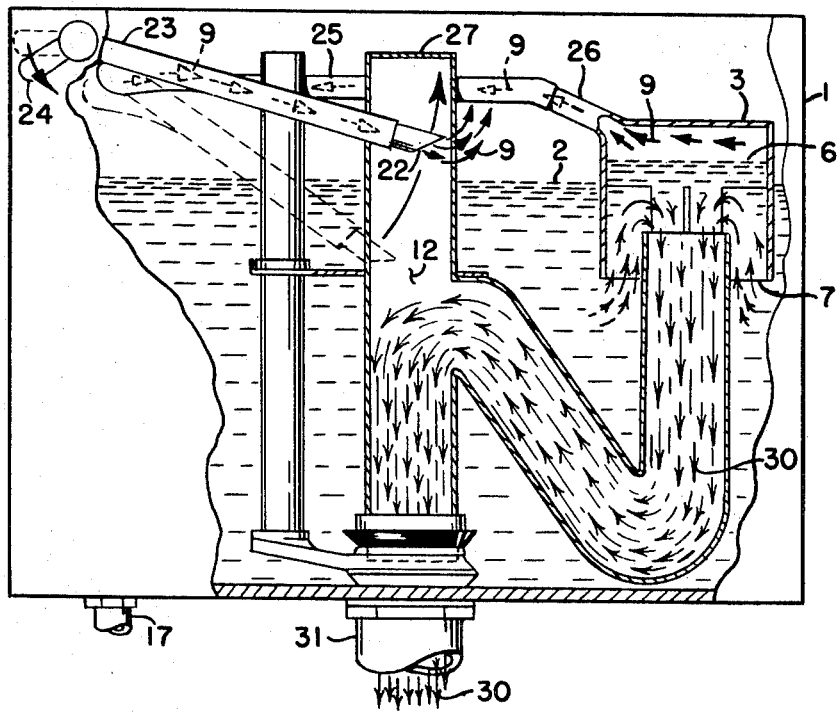
FIG. 5 is the same as FIG. 1 except the system is in the middle of the exhausting or flushing operation.

To operate the device, handle 24 is depressed in the direction of the nearby arrow FIG. 5. A pivoting motion causes arm 23 to swing up in the opposite direction carrying end 22 out of the water in the reservoir. The exposure permits air trapped in inverted cup 3 to be emitted into the atmosphere in the direction of arrows 9. Because of reduced air pressure on its surface 6, water in the cap rises from the position shown in FIG. 1 to the top of the cap. The force due to gravity then causes a portion of the water to occupy air space 9 of FIG. 1 and to leave the reservoir in the direction of arrows 30 of FIG. 5.

Figure 6:
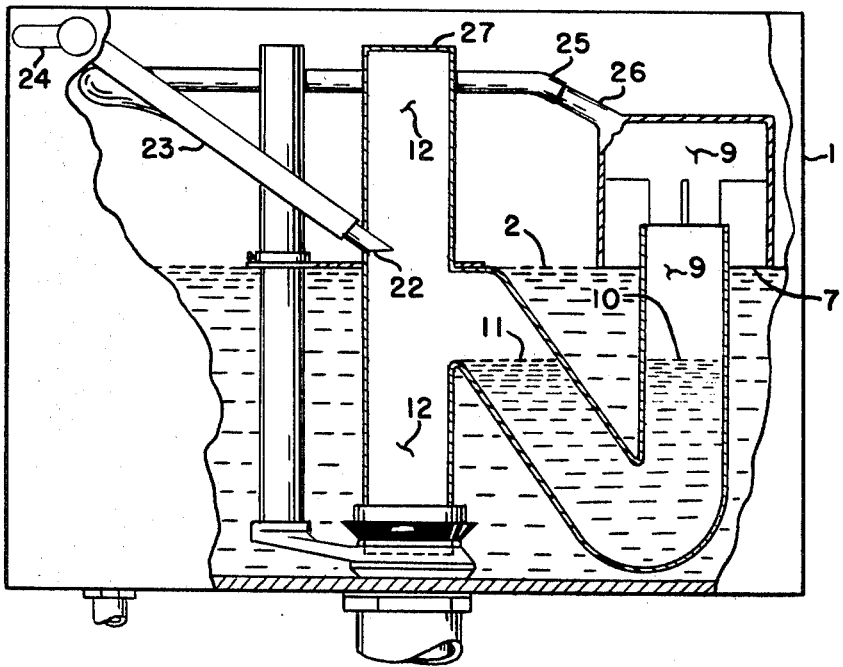
FIG. 6 is also the same as FIG. 1 except the system has just been exhausted and the reservoir is ready to be refiled.

When the reservoir is thus partially emptied, the bowl has thereby been flushed and the water levels are approximately those shown in FIG. 6. As water again enters through source 17 end 22 of tube 25 is again submerged by the water level 2 rising in the reservoir. End 22 rests slightly above the rim of cap 3 for proper operation. As water enters the reservoir, its levels at points 10 and 11 in conduit 8 assume the positions shown in FIG. 1 because of the resolution of forces. Water will pour into space 12 and out pipe 31 even without lifting end 22 if a sufficient hydrostatic head exists. For this reason, it is important to adjust the cut-off valve to prevent too much water from entering the tank.

Calling attention to the form of my invention shown on the third page of the drawings, conduit 26a is connected to air passageway 25 appearing in other figures. Chamber 9 is now framed by sides 3a and 7a in place of inverted cup 3 of FIG. 1.

Figure 9:
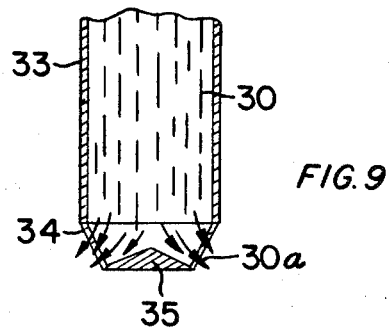
FIG. 9 is a diagrammatic detail of the lower portion of such modification.
Figure 10:
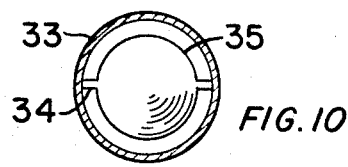
FIG. 10 is a top plan view of the portion shown in FIG. 9.

Upon flushing, the water 11 passes through space 12 and out pipe 33 on its way to the toilet bowl (not illustrated). Pipe 33 has a novel flow resistance means. Tapered walls 34 in combination with a centrally located deflector 35 buffers the flow of water as indicated by arrow 30a of FIG. 9. In combination therewith, I have provided a supplemental fluid inlet 32 directly over deflector 35. The inlet connects with usual conduit 36 leading to a liquid source. When my invention is used as the flushing system of the ordinary water closet, bowl refill water enters conduit 36. However, instead of being directed into the overflow pipe, as is usual, this relatively small stream of water is now directed into the mainstream of water during the flushing operation. Because of the direction of flow from inlet 32 and the presence of deflector 35 the syphoning action will not fail, even if open end 22 of arm 23 remains indefinitely above the water level. Whenever, at any time, open end 22 is again submerged, the syphoning cycle will be automatically completed.

It is to be understood that one skilled in the art may make changes which will be within the scope of the invention as claimed. Although use as part of a water closet is described, the invention is adaptable to other uses.

I claim:
1. In a fluid control device the combination of:
   (a) a liquid container;
   (b) a liquid inlet in said container;
   (c) valve means connected to said inlet and operable to automatically stop the flow of liquid into said container when the surface of the liquid in said container has reached a predetermined level and to automatically allow the flow of liquid into said container when said liquid surface drops below said predetermined level;
   (d) a liquid outlet in said container;
   (e) conduit means in said container having a liquid trap portion therein capable of trapping liquid, one end of said conduit means being connected to said outlet;
   (f) air trap means at the opposite end of said conduit means, the downwardly facing opening in said air trap means being located below said predetermined level;
   (g) air conduit means having one end connected to said air trap; and
   (h) means for moving the opposite free end of said air conduit means between a first position below said predetermined liquid level and a second position above said predetermined liquid level;
   (i) whereby when said free end of said air conduit means is in said first position and the liquid is at said predetermined level air is trapped in said air trap means between the surface of the liquid at the downwardly facing opening and the liquid in the trap portion of said conduit and movement of the free end of said air conduit means above the predetermined level to said second position allows said trapped air to be released permitting the liquid to flow out of said contained through said conduit means.

2. A fluid control device as claimed in claim 1 wherein said opposite end of said liquid conduit means extends upwardly to a point below said predetermined level and said air trap means comprises a bell-shaped cap the side walls of which extend downwardly around and spaced from the end of said liquid conduit to a point below the end of said liquid conduit, one end of said air conduit means communicating with the interior of the upper portion of said cap.

3. A fluid control device as claimed in claim 1 wherein said liquid conduit means has a generally N-shaped configuration.

4. A fluid control device as claimed in claim 1 further comprising a compartment communicating with said liquid conduit means between said liquid trap portion and said outlet to provide an air cushioning action to smooth the flow of liquid.

5. A fluid control device as claimed in claim 1 wherein said first position for the free end of said air conduit means is at a level above the level of the downwardly facing opening in said air trap means.

6. A fluid control device as claimed in claim 1 further comprising a supplemental fluid inlet and conduit means connecting said supplemental fluid inlet to said valve means, said supplemental fluid inlet being located above said liquid outlet to permit flow of liquid directly from said supplemental inlet to said outlet, said liquid outlet including flow restriction means whereby the flow of liquid from said supplemental inlet combined with said flow restriction means serves to maintain syphoning action while said free end of said air conduit means is above the surface of the liquid.

7. A fluid control device as claimed in claim 6 wherein said flow restriction means comprises a deflector in said liquid outlet.

References Cited
UNITED STATES PATENTS

| 1,618,362 | 2/1927 | Allman | 137—142X |
| 2,029,939 | 2/1936 | Niccolai | 137—142X |
| 2,612,903 | 10/1952 | Carnerero | 137—133 |
| 2,878,484 | 3/1959 | Cue | 4—43 |
| 2,884,648 | 5/1959 | Dykes | 4—43 |
| 2,920,329 | 1/1960 | Niccolai | 4—43 |

LAVERNE D. GEIGER, Primary Examiner

H. K. ARTIS, Assistant Examiner

U.S. Cl. X.R.

137—133